United States Patent [19]
Lotz
[11] Patent Number: 4,566,487
[45] Date of Patent: Jan. 28, 1986

[54] CYLINDRICAL PISTON-TYPE SLIDE VALVE FOR PNEUMATIC JIGGING MACHINES

[75] Inventor: Alexander Lotz, Wetter, Fed. Rep. of Germany

[73] Assignee: M.A.N. Maschinenfabrik Augsburg-Nürnberg, Fed. Rep. of Germany

[21] Appl. No.: 689,651

[22] Filed: Jan. 8, 1985

[30] Foreign Application Priority Data

Jan. 11, 1984 [DE] Fed. Rep. of Germany ....... 3400659

[51] Int. Cl.[4] .......................... F16K 11/22; B03B 5/20

[52] U.S. Cl. .................................... 137/597; 137/594; 137/862; 209/502

[58] Field of Search ................... 137/624.15, 862, 594, 137/596, 597, 601, 637.3; 209/500, 502

[56] References Cited

U.S. PATENT DOCUMENTS

| | | | |
|---|---|---|---|
| 2,331,580 | 10/1943 | Strawn | 137/624.15 X |
| 3,058,488 | 10/1962 | Hirst et al. | 137/596 |
| 4,127,480 | 11/1978 | Aldick et al. | 209/502 X |
| 4,176,749 | 12/1979 | Wallace et al. | 209/500 X |
| 4,508,620 | 4/1985 | Najima et al. | 209/500 |

*Primary Examiner*—A. Michael Chambers
*Assistant Examiner*—John C. Fox
*Attorney, Agent, or Firm*—McGlew and Tuttle

[57] ABSTRACT

An arrangement for a rotary cylindrical piston-type slide valve for pneumatic jigging machines includes a housing of symmetrical design including a double rotary piston slide valve portion and a rotary slide valve single portion mounted in a symmetrical arrangement provided for each of the washing compartments.

2 Claims, 2 Drawing Figures

CYLINDRICAL PISTON-TYPE SLIDE VALVE FOR PNEUMATIC JIGGING MACHINES

FIELD AND BACKGROUND OF THE INVENTION

This invention relates in general to the construction of valves and in particular to a new and useful symmetrically arranged valve which comprises a single rotary valve piston and a housing having a central fluid passage and a double rotary piston valve arrangement below and with a portion on each side of the central fluid passage.

In a prior art pneumatic jigging machine for upgrading coal or preparing other minerals, where additional strokes are super-imposed on basic strokes (German Pat. No. 26 54 593), comprising one or more water filled washing compartments including a jig bed for the material to be prepared and one or more air chambers which are provided at the side of, or below, the jig bed and are exposable to pulses of compressed air, which air chambers communicate, through air lines having air inlets and air outlets and through interposed control devices (rotary piston slide valves), to an air tank, the rotary piston slide valves for basic strokes, and for additional strokes, are provided between the air tank and the jigging machine in tandem arrangement, considered in the longitudinal direction of the machine.

In such a design, the two air lines are angled below the rotary piston slide valve and extend toward the center where they are united to a single line. A relatively large space is needed if two rotary piston slide valves and their associated lines are to be provided for each of the washing compartments.

SUMMARY OF THE INVENTION

The invention is directed to an arrangement of rotary piston slide valves in jigging machines, which requires as little space as possible.

a cylindrical piston-type slide valve for each of the washing compartments of pneumatic jigging machines comprises a rotary piston slide valve and a housing for controlling the additional strokes and a double rotary piston slide valve and housing arranged in symmetrical design with the single rotary piston slide valve housing, said slide valve being capable of controlling the basic strokes and the stroke outlet off for only controlling the stroke outlet.

By uniting two rotary piston slide valves in a common housing, not only space is saved, but also the air line junctions with the angled portions below the valves, needed in prior art jigging machines, can be omitted, due to the unification of the air streams in the housing of the rotary piston slide valves. This results in a reduction of flow losses.

The inventive rotary piston slide valve can be used not only in jigging machines according to the above-mentioned German Pat. No. 26 54 593, but also in fine-grain jiggers to which a high percentage of coarse material is fed. In such cases, the basic strokes are omitted, and the machine is operated only with the additional strokes. Then, the lower part of the inventive valve assembly, namely the double rotary piston slide valve, is used only for controlling the outlet for the additional strokes. In this lower part of the assembly, the air inlet of the valve is shut off, or no air inlet at all is provided in this double valve.

Within the above mentioned field of application, rotary pistons and valve liners, particularly of the double valve, may be exchangeable.

Accordingly, it is an object of the invention to provide a rotary valve construction which is of symmetrical design and includes at least two or more rotary valves capable of controlling a jigging machine.

A further object of the invention is to provide a rotary valve construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
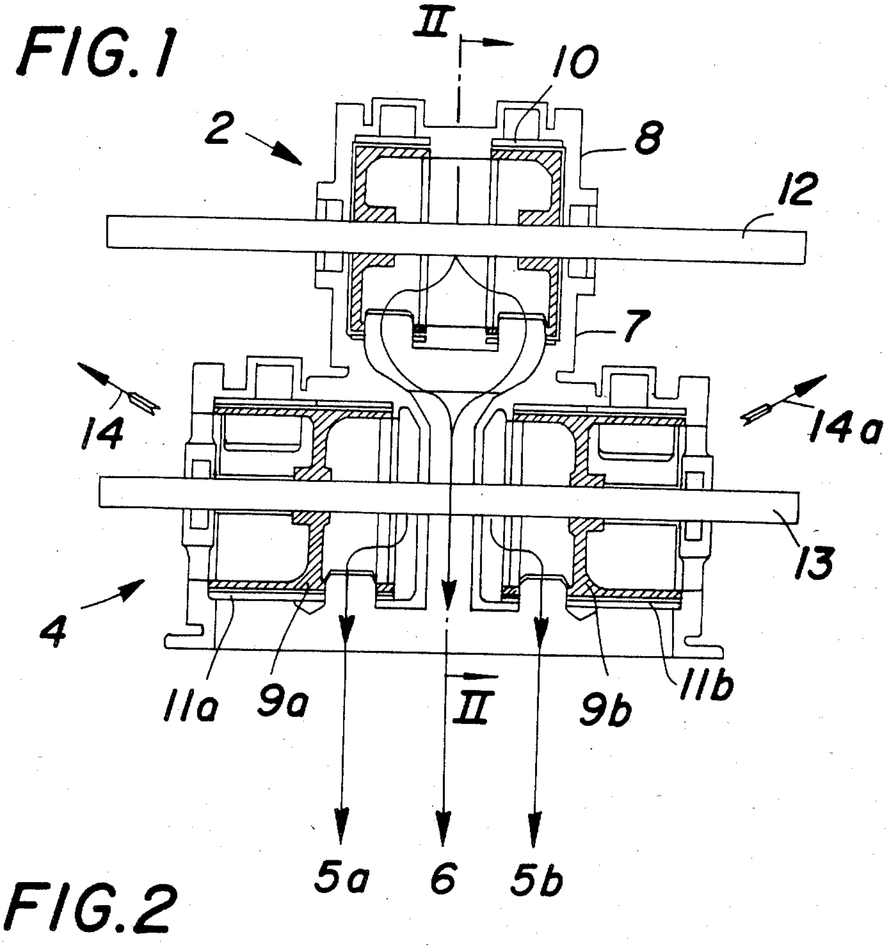
FIG. 1 is a longitudinal section of the inventive slide valve.

Referring to the drawings in particular the invention embodied therein comprises a rotary valve construction which includes a housing having a first central upper valve housing portion 2 and a central additional stroke air passage 6. A first rotary piston valve 8 is positioned in the upper valve housing and a first shaft extends through the upper valve housing and is rotatably supported therein. A double rotary piston slide valve housing 4 is located below said first central upper valve housing 2 and has a housing part symmetrically arranged on each side of the central additional stroke air passage 6. The second rotary piston valve *9a* and a third rotary piston valve *9b* are mounted in respect to housing parts and they are carried on a second shaft 13 which extends through these housing parts and is rotatably journalled therein.

The shown rotary piston slide valve assembly is used, for example, in a jigging machine according to the above mentioned German Pat. No. 26 54 593, to which applicant refers as to the design of the machine and operation thereof with basic and additional strokes.

The upper housing part includes a single piston slide valve 2, and the lower housing part encloses a double piston slide valve 4 and they are advantageously assembled as a sandwich structure to a common housing.

Figure 2:
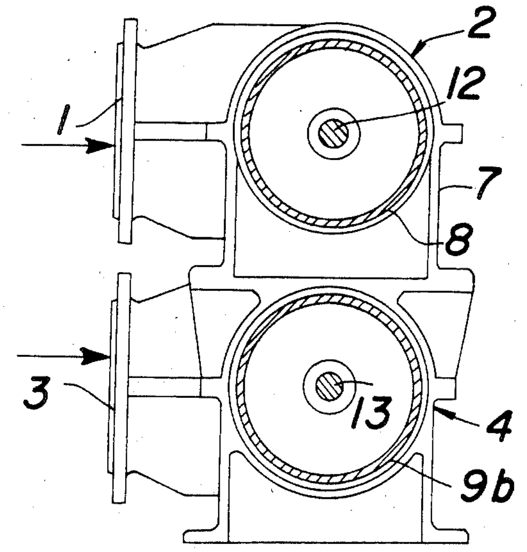
FIG. 2 is a sectional view taken along the line II—II of FIG. 1.

As shown in FIG. 2, the air for the additional strokes, coming from an air vessel (not shown) enters the upper rotary piston slide valve 2 at 1, while the air for the basic stroke enters the lower rotary piston slide valve 4 at 3. The lower valve 4 is of symmetrical design.

The basic stroke air enters the respective jig or washing compartment through inlets designated by arrows at *5a* and *5b*, and the additional stroke air enters at inlet shown by arrow 6 (between inlets *5a* and *5b*).

A common air escape for both basic and additional strokes is provided through one or more air escape outlets 14 and *14a* in the lower part of the housing, i.e. at the double slide valve 4.

In a manner known per se, the rotary pistons 8, *9a* and *9b* mounted within common housing 7, as well as the opposite slide valve liners 10, 11*a*, and 11*b* are provided with apertures which are associated with corresponding apertures or outlet ports in housing 7 which permit stroke outlet flow in the direction of arrows 5*a* and 5*b* on each side of the stroke outlet flow shown by arrow 6 from the single piston slide valve 2.

The two shafts 12 and 13 of the pistons are advantageously driven from a common motor through chains (not shown). By providing sprocket wheels of unequal size, unequal speeds of shafts 12 and 13 are obtained. For example, upper piston slide valve 2 for controlling the additional strokes operates at a fourfold speed relative to the lower double valve 4 for controlling the basic strokes.

Should the jigging machine be operated only with additional strokes, it is possible, as mentioned above, to make the lower part inoperative by shutting off air inlet 3 of valve 4 by means of a closing mechanism (not shown).

For this purpose, however, it is also possible (not shown) to design the lower valve 4 without an air inlet 3 and without air inlets 5, 5*b* leading to the washing compartment, so that this lower valve then serves the sole purpose of controlling the additional strokes at outlet 14, 14*a*. In such an instance the overall length of the valve assembly can be reduced, since air openings 3, 5*a*, 5*b* may be omitted.

A cylindrical piston-type slide valve for each of the washing compartments of pneumatic jigging machines comprises a rotary piston slide valve for controlling the additional strokes, and a double rotary piston slide valve in symmetrical design for controlling the basic strokes and the stroke outlet, or only for controlling the stroke outlet, are united in a common housing.

While a specific embodiment of the invention has been shown and described in detail to illustrate the application of the principles of the invention, it will be understood that the invention may be embodied otherwise without departing from such principles.

What is claimed is:

1. A rotary valve construction, comprising a housing having a first central upper valve housing portion, a central additional stroke air passage extending from one side of said first central upper valve housing portion, a first rotary piston valve controlling the flow through said central additional air stroke passage located in said first central upper valve housing, a first shaft extending through and rotatably supported in said first central upper valve housing and carrying said first rotary piston valve, a double rotary piston slide housing portion below said first central upper valve housing portion and having two housing parts symmetrically arranged with respect to said first central upper valve housing portion and with a stroke air passage on each side of said central additional stroke air passage, said central additional stroke air passage extending through said double rotary piston slide housing portion between said housing portion between said housing parts, a second and third rotary piston valve in respective ones of said housing parts, a second shaft extending through said valve housing parts and rotatably supported therein and carrying said second and third rotary piston valves for controlling the flow through said stroke air passage on each side of said central additional stroke air passage.

2. A rotary valve construction according to claim 1, including a first slide valve liner disposed between said first central upper valve housing portion and its associated piston valve, and second and third slide valve liners between said housing parts and said associated second and third rotary piston valves, said second and third piston valves and slide valve liners being exchangeable.

* * * * *